United States Patent
Do et al.

(10) Patent No.: US 9,229,089 B2
(45) Date of Patent: Jan. 5, 2016

(54) ACQUISITION OF NAVIGATION ASSISTANCE INFORMATION FOR A MOBILE STATION

(75) Inventors: Ju-Yong Do, Palo Alto, CA (US); Dominic Gerard Farmer, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/813,351

(22) Filed: Jun. 10, 2010

(65) Prior Publication Data
US 2011/0306323 A1    Dec. 15, 2011

(51) Int. Cl.
*H04M 3/42* (2006.01)
*G01S 5/02* (2010.01)
*G01C 21/20* (2006.01)

(52) U.S. Cl.
CPC ............ *G01S 5/0236* (2013.01); *G01C 21/20* (2013.01); *G01S 5/0252* (2013.01)

(58) Field of Classification Search
CPC ......... H04W 4/02; H04W 64/00; H04W 4/18; H04W 4/20; H04W 4/021; H04W 4/023; H04W 4/046; H04W 4/12; H04W 4/206; H04W 4/025; H04M 1/7253; H04M 1/72572; H04M 2250/12; H04M 2250/52; H04M 2250/64; G01S 5/0235; G01S 5/0252
USPC .......... 455/412.1, 414.1, 456.1, 456.2, 456.3, 455/41.2, 41.1, 457; 342/357.42, 357.64, 342/357.43; 701/470, 300
See application file for complete search history.

(56) References Cited

U.S. PATENT DOCUMENTS

| 6,452,544 B1 | 9/2002 | Hakala et al. |
| 6,542,824 B1 | 4/2003 | Berstis |

(Continued)

FOREIGN PATENT DOCUMENTS

| CN | 1272922 | 11/2000 |
| CN | 1286424 | 3/2001 |

(Continued)

OTHER PUBLICATIONS

Alberto et al., "Inertial Navigation Systems for User-Centric Indoor Applications", Oct. 2010, XP002663219, Retrieved from the Internet: URL:http://geoweb.crs4.it/lib/exe/fetch.php"id=indoornavigation&cache=cache&media=ne[retrieved on Nov. 10, 2011]the whole document.

(Continued)

*Primary Examiner* — Mahendra Patel
(74) *Attorney, Agent, or Firm* — M. Munes Tomeh (57) ABSTRACT

Navigation assistance information for a mobile station is acquired based on a feature descriptor of an image of a visual beacon captured by the mobile station. The navigation assistance information includes locations of neighboring visual beacons, locations of wireless positioning resources; user environmental context information. The navigation assistance information may then be used to assist in navigating within the local environment. The visual beacon may be an artificial feature, such as a QR code or other type of matrix or bar code or a natural feature, such as a statute or architectural detail. The mobile station may request navigation assistance by transmitting the feature descriptor to a server. The server retrieves the navigation assistance information from a database based on the feature descriptor and optionally location information, which may also be provided in the navigation assistance request, and transmits the navigation assistance information to the mobile station.

41 Claims, 6 Drawing Sheets

(56) References Cited

U.S. PATENT DOCUMENTS

| | | |
|---|---|---|
| 6,556,722 B1 | 4/2003 | Russell et al. |
| 6,594,600 B1 | 7/2003 | Arnoul et al. |
| 6,859,729 B2 | 2/2005 | Breakfield et al. |
| 7,487,042 B2 | 2/2009 | Odamura |
| 7,845,560 B2 | 12/2010 | Emanuel et al. |
| 7,991,222 B2 | 8/2011 | Dimsdale et al. |
| 8,060,302 B2 * | 11/2011 | Epshtein et al. ............. 701/438 |
| 2002/0126364 A1 | 9/2002 | Miles |
| 2002/0169551 A1 * | 11/2002 | Inoue et al. ................. 701/213 |
| 2003/0155413 A1 | 8/2003 | Kovesdi et al. |
| 2004/0028258 A1 | 2/2004 | Naimark et al. |
| 2004/0039519 A1 * | 2/2004 | Burg et al. .................... 701/200 |
| 2004/0189517 A1 | 9/2004 | Pande et al. |
| 2005/0008256 A1 | 1/2005 | Uchiyama et al. |
| 2005/0020309 A1 | 1/2005 | Moeglein et al. |
| 2005/0026630 A1 * | 2/2005 | Iso et al. ..................... 455/456.3 |
| 2005/0037775 A1 | 2/2005 | Moeglein et al. |
| 2005/0143916 A1 | 6/2005 | Kim et al. |
| 2005/0159154 A1 | 7/2005 | Goren |
| 2005/0167504 A1 * | 8/2005 | Meier ................. G06K 7/10712 235/462.45 |
| 2005/0190972 A1 | 9/2005 | Thomas et al. |
| 2005/0222767 A1 * | 10/2005 | Odamura ........... G01C 21/3623 701/484 |
| 2005/0253718 A1 | 11/2005 | Droms et al. |
| 2006/0095349 A1 | 5/2006 | Morgan et al. |
| 2006/0136129 A1 | 6/2006 | Yokozawa |
| 2006/0229058 A1 | 10/2006 | Rosenberg |
| 2007/0263924 A1 | 11/2007 | Kochi et al. |
| 2007/0293146 A1 * | 12/2007 | Lai et al. ..................... 455/3.06 |
| 2008/0069405 A1 | 3/2008 | Endo et al. |
| 2008/0082258 A1 | 4/2008 | Pham et al. |
| 2008/0095402 A1 | 4/2008 | Kochi et al. |
| 2008/0096527 A1 | 4/2008 | Lamba et al. |
| 2008/0109302 A1 | 5/2008 | Salokannel et al. |
| 2008/0137912 A1 | 6/2008 | Kim et al. |
| 2008/0153516 A1 | 6/2008 | Hsieh |
| 2008/0214149 A1 * | 9/2008 | Ramer et al. ............... 455/414.1 |
| 2009/0005975 A1 | 1/2009 | Forstall et al. |
| 2009/0048779 A1 | 2/2009 | Zeng et al. |
| 2009/0093959 A1 | 4/2009 | Scherzinger et al. |
| 2009/0098873 A1 | 4/2009 | Gogic |
| 2009/0115656 A1 | 5/2009 | Raman et al. |
| 2009/0248304 A1 | 10/2009 | Roumeliotis et al. |
| 2009/0254276 A1 | 10/2009 | Faulkner et al. |
| 2009/0262974 A1 | 10/2009 | Lithopoulos |
| 2010/0017115 A1 | 1/2010 | Gautama |
| 2010/0030469 A1 * | 2/2010 | Hwang et al. ................. 701/209 |
| 2010/0083169 A1 * | 4/2010 | Athsani et al. ................ 715/810 |
| 2010/0125409 A1 * | 5/2010 | Prehofer ....................... 701/207 |
| 2010/0329513 A1 | 12/2010 | Klefenz |
| 2011/0021207 A1 | 1/2011 | Morgan et al. |
| 2011/0039573 A1 | 2/2011 | Hardie |
| 2011/0143779 A1 * | 6/2011 | Rowe et al. ................ 455/456.3 |
| 2011/0178708 A1 | 7/2011 | Zhang et al. |

FOREIGN PATENT DOCUMENTS

| | | |
|---|---|---|
| CN | 1637769 A | 7/2005 |
| CN | 101046378 A | 10/2007 |
| CN | 101144722 A | 3/2008 |
| EP | 1555541 A2 | 7/2005 |
| EP | 1790993 A2 | 5/2007 |
| GB | 2441644 A | 3/2008 |
| JP | H07231473 A | 8/1995 |
| JP | 10213644 | 8/1998 |
| JP | H11304489 A | 11/1999 |
| JP | 2000046856 A | 2/2000 |
| JP | 2004213191 A | 7/2004 |
| JP | 2005189225 A | 7/2005 |
| JP | 2005257738 A | 9/2005 |
| JP | 2005530365 A | 10/2005 |
| JP | 2006170872 A | 6/2006 |
| JP | 2006184235 A | 7/2006 |
| JP | 2007525094 T | 8/2007 |
| JP | 2008111828 A | 5/2008 |
| JP | 2011525234 A | 9/2011 |
| TW | 593981 B | 6/2004 |
| WO | 2005004528 A1 | 1/2005 |
| WO | 2005124594 A1 | 12/2005 |
| WO | WO-2008025013 | 2/2008 |
| WO | 2008093103 A2 | 8/2008 |
| WO | 2009098319 A2 | 8/2009 |

OTHER PUBLICATIONS

International Search Report and Written Opinion -PCT/US2011/040098, International Search Authority—European Patent Office -Aug. 19, 2011.

Mirzaei et al., "A Kalman Filter-Based Algorithm for IMU-Camera Calibration: Observability Analysis and Performance Evaluation", IEEE Transactions on Robotics, vol. 24, No. 5, Oct. 2008.

* cited by examiner

Fig. 7

ACQUISITION OF NAVIGATION ASSISTANCE INFORMATION FOR A MOBILE STATION

BACKGROUND

The use of accurate position information of a mobile station, such as cellular or other wireless communication devices, is becoming prevalent in the communications industry. The satellite positioning system (SPS), such as the Global Positioning System, offers an approach to providing wireless mobile station position determination. A SPS user can derive precise navigation information including three-dimensional position, velocity and time of day through information gained from satellite vehicles (SVs) in orbit around the earth. The signals that are received from the SVs are typically weak. Therefore, in order to determine the position of a mobile station, the SPS receiver must be sufficiently sensitive to receive these weak signals and interpret the information represented by them.

One limitation of current SPS receivers is that their operation is limited to situations in which multiple satellites are clearly in view, without obstructions, and where a good quality antenna is properly positioned to receive such signals. As such, they normally are unusable in areas with blockage conditions, such as where there is significant foliage or buildings or other obstacles (e.g., urban canyons) and within buildings.

SUMMARY

Navigation assistance information may be acquired for a mobile station based on feature descriptors of an image of a visual beacon captured by the mobile station. The navigation assistance information includes locations of neighboring visual beacons, locations of wireless positioning resources and user environmental context information. The navigation assistance information may then be used to assist in navigating within the local environment. The visual beacon may be an artificial feature, such as a QR code or other type of matrix or bar code or a natural feature, such as a statute or architectural detail. The mobile station may request navigation assistance by transmitting the feature descriptors to a server. The server retrieves the navigation assistance information from a database based on the feature descriptors and optionally location information, which may also be provided in the navigation assistance request, and transmits the navigation assistance information to the mobile station.

DETAILED DESCRIPTION

A system and method described herein uses a visual beacon to acquire navigation assistance information, which enables position determination and navigation without the need for signals from a satellite positioning system (SPS). Acquiring information that may assist in navigation of mobile station based on a visual beacon such as a data code label or QR code is described in general in U.S. Ser. No. 12/540,498, filed on Aug. 13, 2009, entitled "Accessing Positional Information for a Mobile Station Using a Data Code Label, by Edward T. L. Hardie, which is assigned to the same assignee as the present patent document, and which is incorporated by reference herein it its entirety. The system and method described herein may include a mobile station that uses features from visual beacons to request navigation assistance and in response receives a navigation assistance message. The navigation assistance message may include information with respect to the position of the visual beacon 104, and therefore the mobile station 102, as well as information with respect to neighboring visual beacons, wireless positioning resources, and user context and environmental context.

As used herein, a mobile station refers to a device such as a cellular or other wireless communication device, personal communication system (PCS) device, personal navigation device, Personal Information Manager (PIM), Personal Digital Assistant (PDA), laptop or other suitable mobile device which is capable of receiving wireless communications. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above is also considered a "mobile station."

Acquiring navigation assistance information for a mobile station using visual beacons as described herein may be advantageous if the mobile station does not have SPS capabilities or if the SPS system is inactive or in locations where SPS may not work adequately, e.g., in locations that suffer from blockage conditions. Blockage conditions may exist where the SPS receiver in the mobile station has difficulty acquiring and/or tracking SPS signals from SPS satellites. For example, blockage conditions may exist in indoor environments, in urban canyon environments, and in certain outdoor environments with natural obstacles, such as foliage and interfering topology.

Navigation without SPS or in blockage conditions presents two related problems: keeping an accurate sense of position and having access to local information about the topology. Navigation without the benefits of SPS is hampered by the relative difficulty of substituting other technologies. For example, almanacs of wireless access points can supply some data, but they would be expensive to compile and the source of almanac data appropriate for a local area may not be obvious to the user of a mobile station. Another example is inertial sensors, which may provide information based on the tracking of movement through dead reckoning, but these tend to amass errors over time. These techniques can benefit from access to information which associates location information with a specific position as well as from access to information which associates a position with related almanac data or available maps.

Figure 1:
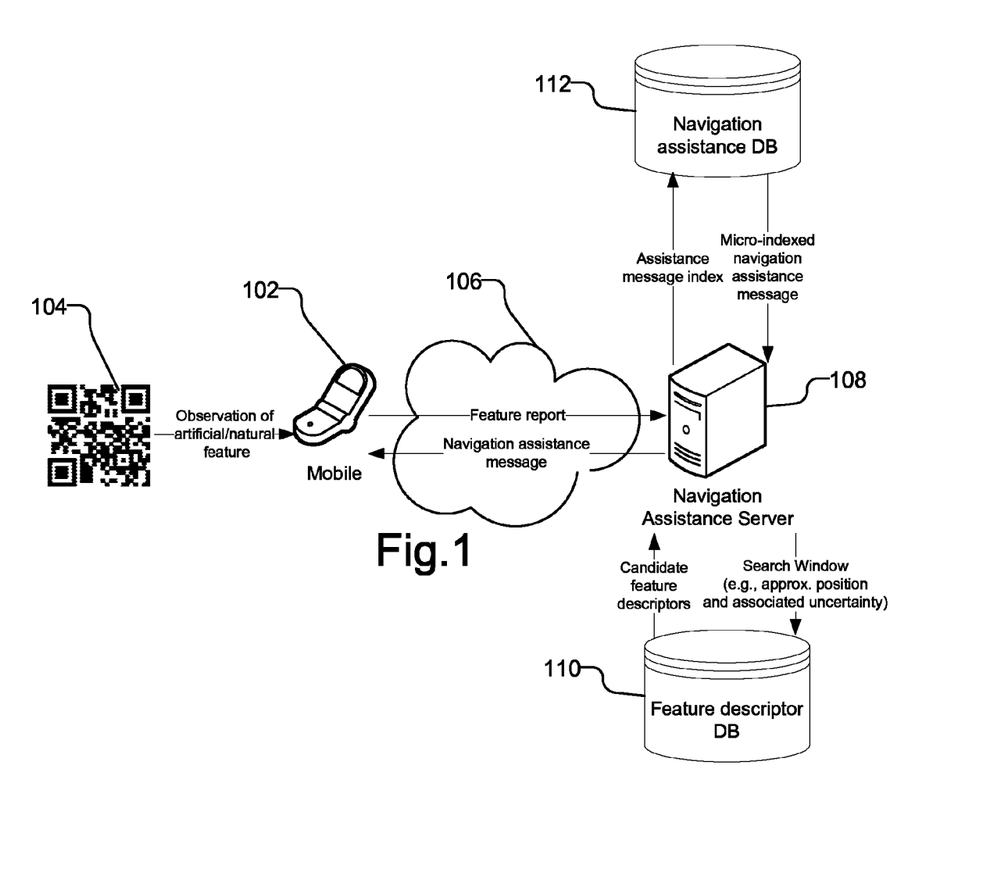
FIG. 1 illustrates a block diagram showing a system in which a mobile station acquires navigation assistance information based on a visual beacon.

FIG. 1 illustrates a block diagram showing a system in which a mobile station 102 acquires navigation assistance information based on a visual beacon 104. The acquired navigation assistance information may include the position of the visual beacon 104 and therefore the mobile station 102, with respect to a coordinate system, which may be a local coordinate system or a generalized global coordinate system, such as the WGS84 coordinate system, as well as information with respect to neighboring visual beacons, wireless positioning resources and user context and environmental context.

As illustrated in FIG. 1, the mobile station 102 observes the visual beacon 104, e.g., by imaging the visual beacon 104. The visual beacon 104 may be an artificial or natural visual beacon that is attached to a location that is accessible to the mobile station 102, such as at an entrance or directory sign to a building, or other accessible location. In general, an artificial beacon refers to a visual object constructed with capability of data encoding and includes 1D, 2D, or 3D matrix codes, typically in a printed format. The visual beacon 104 is illustrated in FIG. 1 as an artificial visual beacon in the form of a Quick Response (QR) code, which is a matrix code created by Japanese corporation Denso-Wave. Other types of bar codes, matrix codes, or machine readable representations of data, including one dimensional bar codes or optical data matrix style codes, such as Data Matrix code, Semacode, Maxicode, Aztec Code may be used if desired. These artificial visual beacons are first detected based on their known structural characteristics (e.g. finder patterns in QR code) and then decoded. The decoded information is used as an index to server database for assistance information. Decoding may include both direct parsing of raw data bits (e.g. reading individual bars or dots in the object) and subsequent information parsing (e.g. interpreting raw bits into meaning information content).

The visual beacon 104, however, may be a "natural" beacon, which includes all other visible objects excluding artificial beacons. These natural beacons are processed through SIFT or other image processing methods for feature descriptor extraction. Natural visual beacons may include features such as doors, buildings, architectural details, sculptures, or other features that can uniquely identify the visual beacon 104, particularly if the approximate position of the mobile station 102 is known. If a natural feature lack sufficient uniqueness within the search window which is the vicinity of mobile's approximate location, there could be more than one matching results in the server searching process. These multiple candidate matches may be preserved with their corresponding matching quality matrices and corresponding likelihood. The mobile station may be informed of either the best candidate among all or multiple candidates with corresponding likelihood. On the mobile station side, when no other positioning information is available, the most likely candidate is presented as a best estimate location and can be fed into a positioning filter (e.g. Kalman filter). If other positioning information is given, the likelihood is re-computed in consideration of other positioning information.

Navigation assistance information is embedded or indexed by the visual beacon 104. For example, if the visual beacon 104 is an artificial visual beacon that is capable of encoding information in a sufficiently dense manner, e.g., using colorized QR codes, the navigation assistance information may be embedded in the visual beacon 104. Alternatively, the navigation assistance information may be indexed by the artificial or natural visual beacon 104. The visual beacon 104 may include a feature that is observed by the mobile station 102 and reported to a navigation assistance server 108 via a wireless network 106 in order to obtain the navigation assistance information. For example, the visual beacon 104 may be encoded with a specific identifier that is reported to a navigation assistance server 108 via the wireless network 106. Alternatively, the visual beacon feature may be a unique or semi-unique attribute of the visual beacon 104, including size, shape, and location, which can be used to identify the visual beacon 104. Thus, all navigation assistance information requests may be routed to the same navigation assistance server 108, where features of the visual beacon 104 are used to access the navigation assistance information. Alternatively, the visual beacon 104 may be embedded with, e.g., a Uniform Resource Identifier (URI), which can be used by the mobile station 102 to access different navigation assistance servers via the wireless network 106.

As illustrated in FIG. 1, the navigation assistance server 108 may be coupled to a feature descriptor database 110, which provides candidate feature descriptors to the navigation assistance server 108. The candidate feature descriptors may be compared to the reported feature that is observed by the mobile station 102 in order to identify the visual beacon 104 observed by the mobile station 102. For example, if the visual beacon 104 is encoded with a specific identifier, the encoded identifier may be compared to the candidate feature descriptors provided by the feature descriptor database 110 to determine an assistance message index, which is used to query the navigation assistance database 112. If desired, the identifier encoded in the visual beacon 104 may be used as the assistance message index to query the navigation assistance database 112. The artificial beacons may be encoded with various types of information contents. For example, with an artificial beacon specifically designed to support the navigation assistance, the artificial beacon may be encoded with content that includes the assistance message index. On the other hand, if the artificial beacon is a non-specific beacon, e.g., encoded with content not related to navigation assistance, such as data related to merchandise information or an internet address, the content of the artificial beacon may be compared to data stored in the database. If there are one or more matches, the server extracts the assistance message indexes corresponding to the matched database entries. Otherwise, the non-specific beacon is declared unrecognizable and a new entry in the data base may be created by registering the content of the unrecognized beacon along with available positioning information provided by the mobile station.

If the visual beacon 104 is not encoded with an identifier, i.e., the visual beacon is a natural visual beacon, the reported features of the visual beacon 104 may be compared to the candidate feature descriptors provided by the feature descriptor database 110 to determine the assistance message index. For example, if the visual beacon 104 is a natural feature, such as an architectural detail or statute, the mobile station 102 may report to the navigation assistance server 108 a description of the image of the visual beacon 104 including e.g., keypoint descriptors determined using Scale Invariant Feature Transform (SIFT), as well as the approximate location, which may be determined from the last known valid position of the mobile station 102. The candidate feature descriptors provided by the feature descriptor database 110 can then be compared to the reported features to identify the visual beacon 104 and determine the assistance message index.

The navigation assistance server 108 is coupled to a navigation assistance database 112, which is queried based on the assistance message index. A navigation assistance message that corresponds to the assistance message index is retrieved by the server 108 and provided to the mobile station 102, via the wireless network 106.

Figure 2:
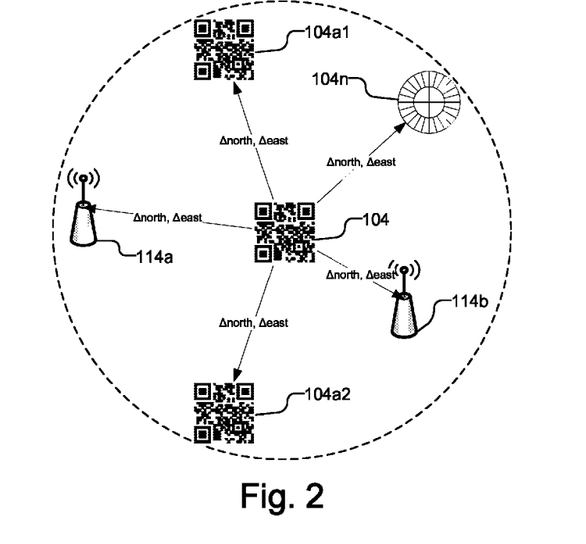
FIG. 2 illustrates graphically information that may be contained within a navigation assistance message.

FIG. 2 illustrates graphically information that may be contained within a navigation assistance message. FIG. 2 illustrates the visual beacon 104 that is imaged by the mobile station 102 in the center. As illustrated, the navigation assistance message may include information regarding neighboring artificial beacons 104a1 and 104a2, neighboring natural beacons 104n1, wireless positioning resources 114a and 114b, as well as information related to user context and environmental context. The information may include the relative or absolute locations of the neighboring beacons and wireless positioning resources, as well as their size, type, description, and any other useful information. The locations of the neighboring beacons and wireless positioning resources may be provided in terms of distance and direction, as illustrated in FIG. 2. Alternatively, the locations of the neighboring beacons and wireless positioning resources may be provided in the context of the local environment.

Figure 3:
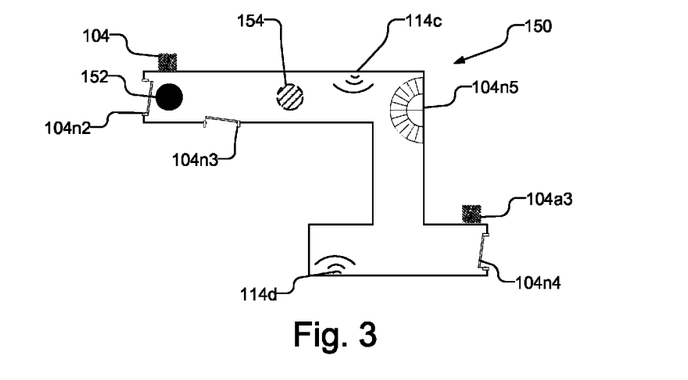
FIG. 3, for example, illustrates graphically information that may be contained within a navigation assistance message in the context of the local environment in the form of a digital map.

FIG. 3, for example, illustrates graphically information that may be contained within a navigation assistance message in the context of the local environment in the form of a digital map 150. By way of example, the location of the visual beacon 104 on the digital map 150 is illustrated. Additionally, the navigation assistance message may include information, such as the location, type, and size, of a neighboring artificial beacon 104a3, as well as the location, type, and size of a neighboring natural beacons, which may be doors 104n2, 104n3, 104n4, and architectural detail 104n5, and the locations and wireless characteristics of wireless positioning resources 114c and 114d. The digital map 150 is an example of the environmental context that may be provided in the navigation assistance message. The environmental context may also include a description of the environment type, such as deep indoor, light indoor, dense urban, urban, suburban, residential, or rural, and a description of surrounding materials, e.g., concrete, wood, metal, glass etc. Additionally, the navigation assistance message may include user context including, e.g., at least one of the average reported user speed, standard deviation of the reported user speed, average reported user dwell time, and standard deviation of reported user dwell time or other statistics of previous user information.

As illustrated in FIG. 3, the digital map 150 that is provided in the navigation assistance message may include the current approximate position of the mobile station, indicated as spot 152, which can be estimated due to the required proximity required to image the visual beacon 104. The digital map 150 may be referenced to a local coordinate system or to a global coordinate system, such as WGS84. It should be understood, that FIG. 3 illustrates a relatively simple digital map 150 of a local indoor environment for illustrative purposes and that the digital map 150 may be as complex as desired or needed. For example, the digital map 150 may include multiple levels, rooms, etc. and may include textual and/or graphical information. Moreover, the digital map 150 is not limited to indoor environments. For example, the digital map 150 may be used for any outdoor environments, particularly where SPS navigation is not accessible due to blockage conditions or is simply not available on the mobile station.

As the mobile station 102 moves within the local environment, the position of the mobile station 102 as determined, e.g., by inertial sensors, by triangulation or other measurement of signals from wireless signals, or by visual localization techniques, may be updated with reference to the local or global coordinate system and displayed on the digital map 150, e.g., as updated position 154. Because inertial sensors alone tend to amass errors over time, the wireless signals and/or visual localization techniques may be used in conjunction with the inertial sensors to minimize errors. Moreover, by capturing images of other artificial or natural visual beacons, the position of the mobile station 102 may be periodically updated or corrected.

Due to the vicinity of the mobile station 102 to the visual beacon 104 that is acquired, the navigation assistance message may include micro-indexed contents that will significantly enhance the positioning and navigation of the mobile station 102. Current navigation assistance is given within a large geographical context, e.g., tens or hundreds of kilometers, with weak relevance to mobile stations current location. Micro-indexed contents of the navigation assistance message, on the other hand, focuses on localized assistance information, e.g., approximately hundreds of meters, in order to optimize the assistance information within the local environment. The localized assistance information is enabled by the high positioning accuracy of visual beacon-based positioning, which provides sub-meter accuracy in contrast to tens or hundreds of meters of accuracy of other urban/indoor positioning technologies. The high urban/indoor positioning accuracy is critical to both data accumulation and distribution. When a mobile station observes a visual beacon, the observation of neighboring navigation resources is tied relative to this visual beacon. Thus, the provided navigation assistance message includes information in the vicinity of the mobile station's current location with an accurate description of the current environment and surrounding navigation resources.

The proposed contents of a navigation message include a description of the visual beacon 104 itself, a list of neighboring artificial features and natural features, list of available wireless positioning resources, statistics of user context, and environmental context. The list of artificial or natural visual beacons enables faster and reliable acquisition of neighboring visual beacons based on their description. Additionally, the micro-indexed navigation assistance information specified in the vicinity of the visual beacon 104 provides a more accurate picture of the region and assists the mobile station 102 to determine the best set of positioning sources to be used and how to acquire and track them. The self description of the visual beacon 104 may include information as provided in Table 1 below.

TABLE 1

| Category | Field Name | Description |
| --- | --- | --- |
| Self Description | artificialFeatureID or naturalFeatureID | Identifier of the referenced feature determined by the server. Mobile station may keep this information for faster future reference. |
| | absoluteLocation | WGS84 absolute latitude, longitude, height of the reference feature |
| | artificialFeatureSize | Referenced feature's accurate physical dimension |

The list of neighboring artificial features may include information such as the visual beacon description, including size and type, and the location, e.g., absolute or relative. The description of neighboring artificial features may include information as provided in Table 2 below.

TABLE 2

| Category | Field Name | Description |
| --- | --- | --- |
| Artificial Features | numNeighboringArtificialFeature | Number of neighboring artificial features listed in this message. The following fields repeat for the given number. |
| | artificialFeatureID | Identifier of artificial feature |
| | absoluteLocation | WGS84 absolute latitude, longitude, height of the neighboring artificial features |
| | relativePosition | Delta north, east, height relative to the reference feature |
| | artificialFeatureType | Artificial feature's type (e.g. QR code, bar code, etc.) |
| | artificialFeatureSize | Artificial feature's physical dimension |

The list of neighboring natural features may include information such as the visual beacon description, including size and type, and the location, e.g., absolute or relative. The description of neighboring natural features may include information as provided in Table 3 below.

TABLE 3

| Category | Field Name | Description |
| --- | --- | --- |
| Natural Features | numNeighboringNaturalFeature | Number of neighboring natural features listed in this message. The following fields repeat for the given number. |
| | naturalFeatureID | Identifier of natural feature |
| | absoluteLocation | WGS84 absolute latitude, longitude, height of the neighboring natural features |
| | relativePosition | Delta north, east, height relative to the reference feature |
| | naturalFeatureType | Natural feature's type (e.g. building, sculpture, etc.) |
| | naturalFeatureSize | Natural feature's physical dimension |

The list of available wireless positioning resources, such as SPS, WiFi, Femtocell, and cellular signals may include acquisition information, such as signal type, signal power level, number of channels, frequency and time offset, and corresponding wireless channel characteristics, as well as tracking statistics, such as accuracy, continuity, integrity, and availability. The description of available wireless positioning resources may include information as provided in Table 4 below.

TABLE 4

| Category | Field Name | Description |
| --- | --- | --- |
| Wireless Positioning Sources | numSignalTypes | Number of available signal types (e.g. SPS, cellular signals, WiFi, broadcast signals, etc.)The following messages repeat for each signal type |
| | signalType | Description of the type of radio signals Signal category: SPS, cellular signals (WWAN), WiFi (WLAN), broadcast signals Detailed signal type: GPS, Glonass, Galileo, Compass, QZSS (for SPS), CDMA, GSM, LTE, WiMAX (for WWAN), WiFi (for WLAN), FM radio, digital TV (for broadcast signals) Transmitter type (applicable to WWAN): macrocells, femtocells |
| | acquisitionAssitanceMsg | Signal acquisition assistance message for this radio signal. Repeat for each signal sources indicated by signalType. Number of available channels (dynamic list for SPS while more static list for cellular and WiFi) List of available radio channel numbers (e.g. SPS sv#, WiFi AP BSSID/SSID, . . .) Source location Expected signal power level Expected frequency and time offset Expected ranging/positioning accuracy and known ranging bias Other aiding message such as SPS ephemeris |

The list of statistics of user context may include statistical information obtained from other users in the same location, such as statistics of whether the average user is stationary, walking, running, or driving. The user context statistical information may be used to assist the navigation engine of the mobile station 102 to determine the proper mode of operation. For example, the description of previous user behavior in the area can provide proper model of expected user behavior specific to this area, which can be used to adjust and adapt the navigation software configuration (such as positioning rate), proper state of navigation filter (stationary, walking, driving), and a set of positioning sources to be used. The description of user context may include information as provided in Table 5 below.

TABLE 5

| Category | Field Name | Description |
| --- | --- | --- |
| User Context | userSpeedAvg | Average reported user speed |
| | userSpeedSTD | Standard deviation of reported user speed |
| | dwellTimeAvg | Average reported user dwelling time in this area |
| | dwellTimeSTD | Standard deviation of reported user dwelling time in this area |

The list of environmental context may include information such as whether the local environment is deep indoor, light indoor, dense urban, urban, suburban, residential, or rural, as well as information about building materials in the local environment, which may affect the received signal strength of wireless signals, and maps of the local environment. The environmental context in the vicinity of the visual beacon assists the navigation engine to determine proper mode of operation. For example, the description of environment context can provide a proper model of expected user behavior specific to this area and can be used to adjust and adapt the navigation process as performed by the position determination unit, such as adjusting a rate of position acquisition, the proper state of navigation filter (stationary, walking, driving), and a set of positioning sources to be used. The description of user context may include information as provided in Table 6 below.

TABLE 6

| Category | Field Name | Description |
| --- | --- | --- |
| Environment Context | environmentType | open outdoor, partially blocked outdoor, urban canyon, light indoor, deep indoor |
| | materialDescription | Description of surrounding materials (concrete, wood, metal, . . .) |
| | surroundingBuildingMap | Map of surrounding building walls |

Figure 4:
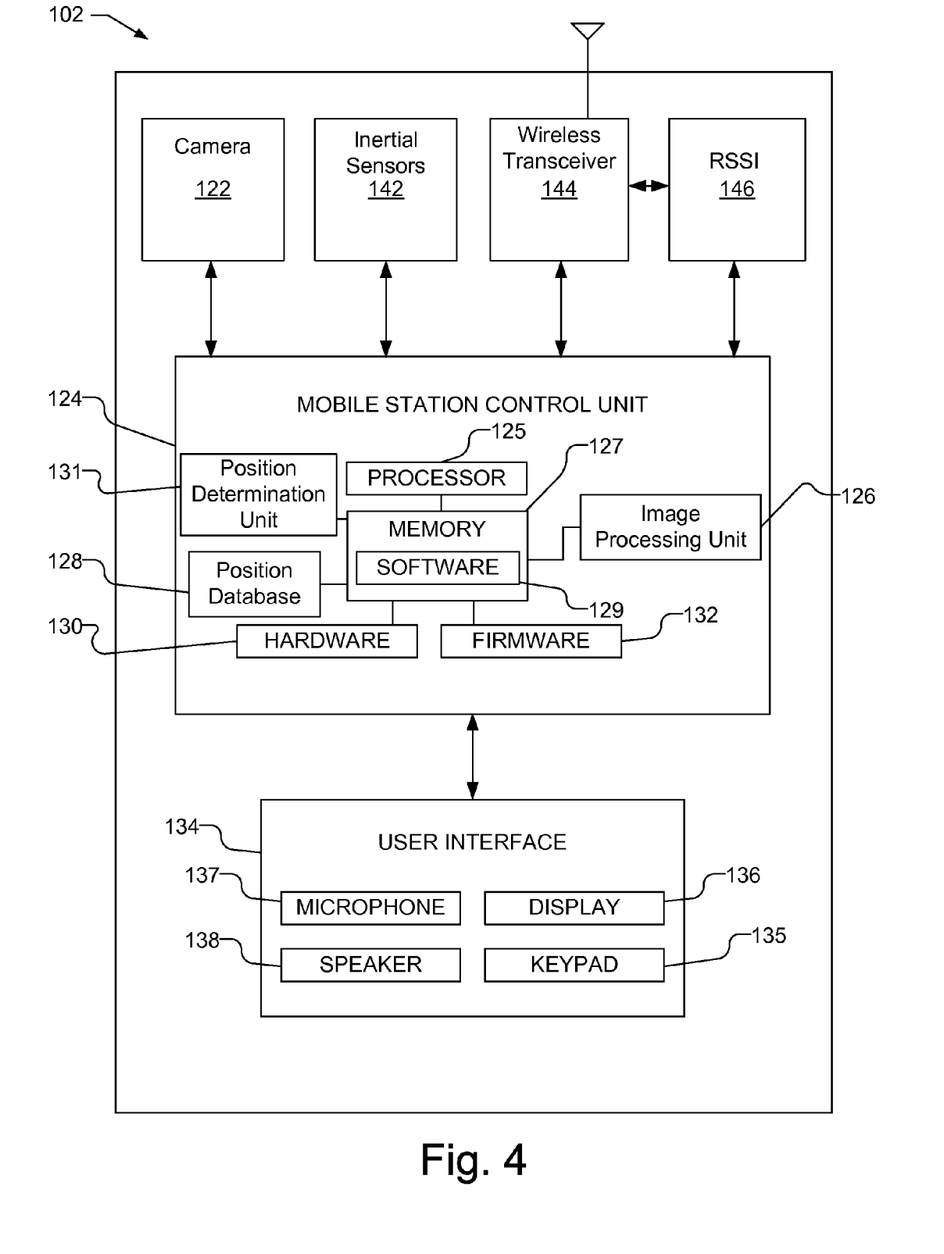
FIG. 4 is a block diagram of a mobile station capable of obtaining navigation assistance information via a navigation assistance message embedded in or indexed by a visual beacon.

FIG. 4 is a block diagram of a mobile station 102 capable of obtaining information via a navigation assistance message embedded in or indexed by a visual beacon 104 (FIG. 1). As illustrated, mobile station 102 includes an imaging sensor, e.g., camera 122, that communicates with a mobile station control unit 124. The mobile station control unit 124 is provided by a processor 125 and associated memory 127, hardware 130, software 129, and firmware 132. It will be understood as used herein that the processor can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile station, and is not to be limited to any particular type of memory or number of memories, or type of media upon which memory is stored.

The mobile station control unit 124 includes an image processing unit 126 that receives the image of the visual beacon 104 from the camera 122 and processes the image to determine identifying features of the visual beacon 104. For example, the processing unit 126 may decode an artificial visual beacon 104 using suitable matrix code label reading software stored in memory 127 to determine the encoded identifier feature or, where the artificial visual beacon 104 is encoded in a sufficiently dense manner, to determine the navigation assistance information embedded in the artificial visual beacon 104. The processing unit 126 may also determine a description of the image of a natural visual beacon 104 including e.g., keypoint descriptors determined using Scale Invariant Feature Transform (SIFT), or using other well known image recognition techniques. If desired, the processing unit 126 may include multiple sub-units to perform the different types of image analysis, e.g., decoding matrix codes and feature recognition.

With the identifying feature from the visual beacon 104 determined, the mobile station control unit 124 accesses the server 108 via wireless network 106 (FIG. 1) using wireless transceiver 144. The wireless transceiver 144 is capable of connecting to server 108 to obtain data, such as the navigation assistance message, using a wireless network 106 through access points 114 for WiFi or Femtocells, and may be a wireless wide area network (WWAN), a wireless local area network (WLAN), a wireless personal area network (WPAN), and so on, or through cellular telephonic access points, such as cellular towers or via satellite vehicles. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

The mobile station 102 may include inertial sensors 142 which may be used to provide data to a position determination unit 131 that determines the position of the mobile station 102. Inertial data, including the direction and magnitude of movement of the mobile station 102, is provided by the inertial sensors 142 to the position determination unit 131 in the mobile station control unit 124, which may then update the determined position of the mobile station accordingly. Examples of inertial sensors that may be used with the mobile station 102 include accelerometers, quartz sensors, gyros, or micro-electromechanical system (MEMS) sensors used as linear accelerometers. Additionally, the mobile station 102 may include a received signal strength indicator system (RSSI) 146 that is connected to the wireless transceiver 144 and the position determination unit 131 of the mobile station control unit 124. The RSSI system 146 determines the signal strength of any signal received by the wireless transceiver 144 and provides the measured signal strength to the position determination unit 131. The measured radio signal strength may be compared to e.g., a wireless positioning resource almanac received in the navigation assistance message. By way of example, the navigation assistance message may include a database of the signal strengths of wireless access points for different positions with respect to the local environment. The current position of the mobile station 102 can be determined to lie in an area that corresponds to the data point in the wireless access point almanac with the highest correlation to the measured radio signal strength. Additionally, the position determination unit 131 may determine a current position based on triangulation with multiple wireless positioning resources based on location information provide in the navigation assistance message. Additionally, the position determination unit 131 may be used to determine the current position of the mobile station using visual localization techniques using images from camera 122. If the mobile station 102 includes a GPS signal receiver, the position determination unit 131 may be used to determine the position of the mobile station 102 based on the received GPS signals. It should be understood that the position determination unit 131 may include separate sub-units that determination position in accordance with the different techniques described. Moreover, the position determination unit 131 may be part of or separate from the process 125. The description of user and/or environment context can be used to adjust and adapt the navigation process as performed by the position determination unit 131, such as adjusting a rate of position acquisition, the proper state of navigation filter (stationary, walking, driving), and a set of positioning sources to be used.

The mobile station 102 also includes a user interface 134 that is in communication with the mobile station control unit 124, e.g., the mobile station control unit 124 accepts data from and controls the user interface 134. The user interface 134 includes a means for displaying images, such as digital display 136, produced by the camera 122 as well as information from the navigation assistance message, such as a digital map. The display 136 may further display control menus and positional information. The user interface 134 further includes a keypad 135 or other input device through which the user can input information into the mobile platform 100. In one embodiment, the keypad 135 may be integrated into the display 136, such as a touch screen display. The user interface 134 may also include a microphone 137 and speaker 138 when the mobile station 102 is a cellular telephone. Additionally, the inertial sensors 142 may be used as part of the user interface 134 by detecting user commands in the form of gestures.

The mobile control unit may include a position database 128 that stores and updates the position of the mobile station 102 based on position information obtained based on information obtained from the navigation assistance message, the inertial sensors 142 or access points 114, which act as wireless positioning resources, via wireless transceiver 144. As the mobile station control unit 124 determines that the position of the mobile station 102 changes, the position database 128 is updated with the new position. The updated positional information can then be provided, e.g., by displaying a digital map with the new position on the display 136 or by providing additional navigation instructions on the display and/or via speaker 138.

Once the positional information is downloaded, the mobile station 102 can navigate using the inertial sensors 142 even after the radio has been turned off, e.g., in "airplane mode" on a cell phone. Moreover, if the visual beacon 104 is capable of embedding the positional information, the mobile station 102 can obtain the map and navigate while in "airplane mode".

The methodologies described herein may be implemented by various means depending upon the application. For example, these methodologies may be implemented in hardware 130, firmware 132, software 129, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

For example, software 129 codes may be stored in memory 127 and executed by the processor 125 and may be used to run the processor and to control the operation of the mobile station 102 as described herein. For example, a program code stored in a computer-readable medium, such as memory 127, may include program code to determine feature descriptors of a visual beacon 104, to request navigation assistances using the feature descriptor, to receive navigation assistance information and use the navigation assistance information to assist in navigating within an environment. The computer-readable medium may include program code to update the position of the mobile station using inertial data provided by inertial sensors 142. Additionally, the computer-readable medium may include program code to measure the strength of a signal from one or more wireless access points that are included in the received navigation assistance information, and to update the position of the mobile station using the measured strength of the signal.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 5:
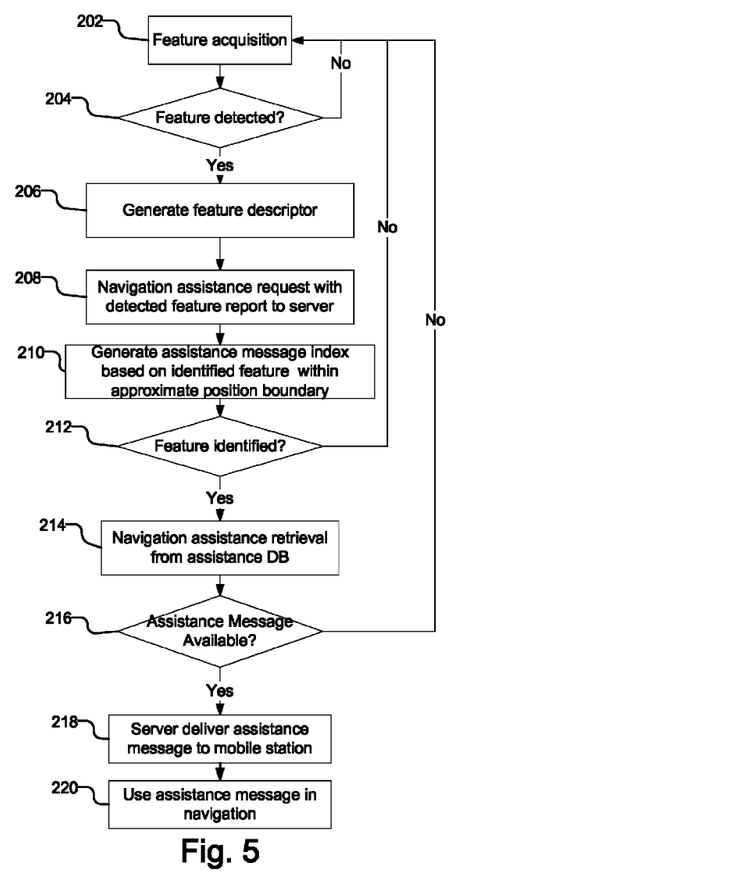
FIG. 5 is a flow chart illustrating the overall system operation including mobile station specific operations and server specific operations.

FIG. 5 is a flow chart illustrating the overall system operation including mobile station 102 specific operations and server 108 specific operations. Generally, there are major actions including feature detection and descriptor generation by the mobile station 102; feature identification based on descriptors by server 108; navigation assistance message retrieval from the database 112 by the server 108; and navigation assistance message transmission from the server 108 and reception by the mobile station 102.

As illustrated in FIG. 5, the process includes feature acquisition (202) from a visual beacon 104 by the mobile station 102. If a feature is detected (204), feature descriptors are generated (206) and a navigation assistance request with the detected feature descriptor is transmitted to the server 108 (208). The navigation assistance request may include the approximate position of the mobile station 102 with associate position accuracy, which may be simply the last position fix via SPS or the updated approximate position stored in the position database 128. The server 108 produces an assistance message index based on the feature descriptor and approximate position (210). The assistance message index may be the feature descriptor itself or may be obtained from the feature descriptor database 110 as illustrated in FIG. 1. If the feature is not identified (212), i.e., there is no assistance message index, then the process returns to feature acquisition (202). If the feature is identified, the server 108 retrieves the navigation assistance message from the navigation assistance database 112 (214). If no navigation assistance message is available (216), then the process returns to feature acquisition (202). If a navigation assistance message is available, the server 108 provides the navigation assistance message to the mobile station 102 (218). The mobile station 102 stores the navigation assistance message in memory 127 and uses the navigation assistance message for navigation.

Figure 6:
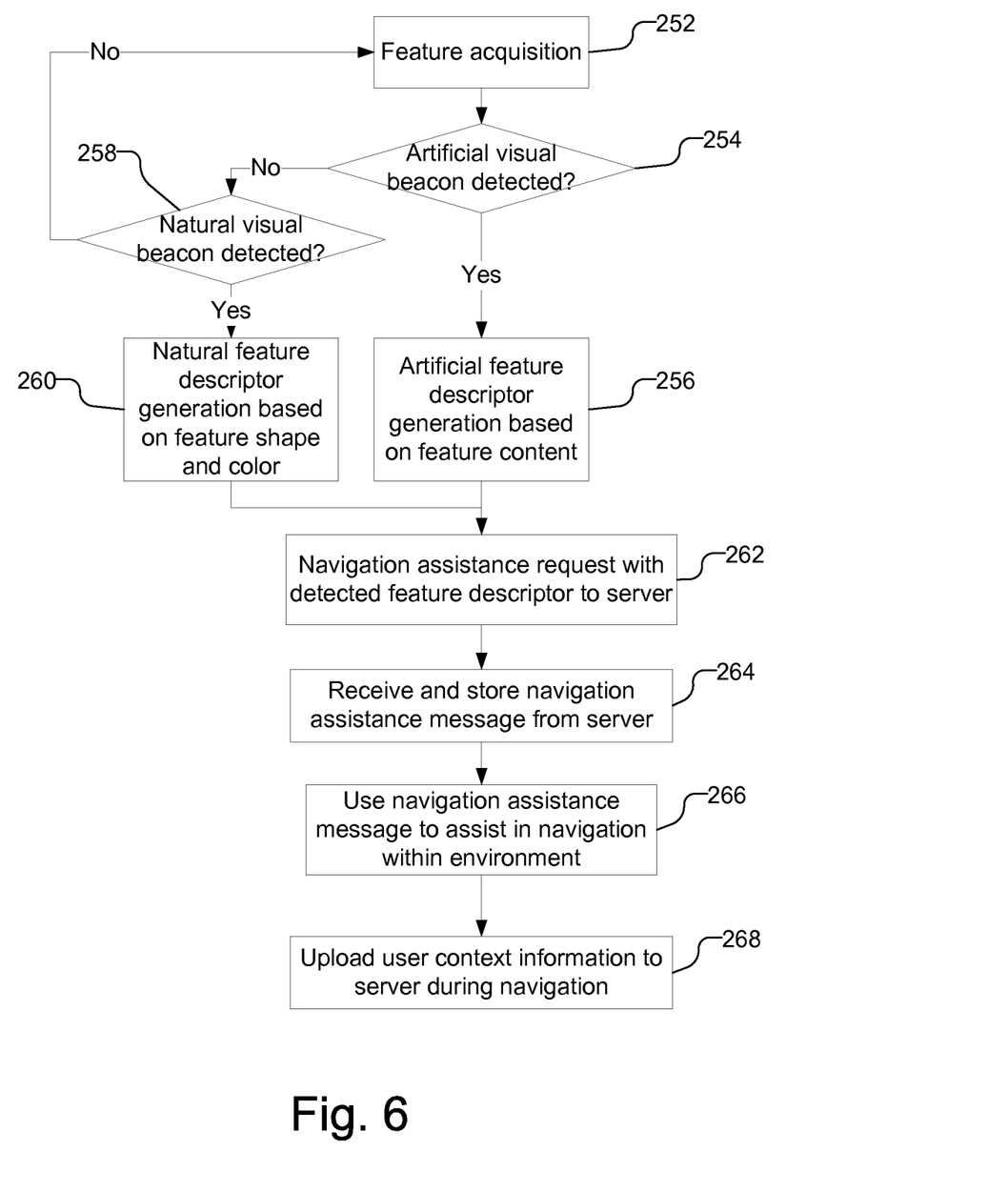
FIG. 6 is a flow chart illustrating the operation of the mobile station to acquire navigation assistance information.

FIG. 6 is a flow chart illustrating the operation of the mobile station 102. The mobile station 102 acquires a feature (252), e.g., by imaging a visual beacon 104, via camera 122. The mobile station 102 determines whether the acquired feature is an artificial visual beacon (254), e.g., based on known finder patterns in a QR code. If the acquired feature is an artificial visual beacon, the corresponding feature descriptors are generated, which may be e.g., a URI or other identifier encoded in the artificial visual beacon (256). If the acquired feature is not an artificial visual beacon (254), the acquired feature is then checked to determine if it contains sufficiently identifiable characteristics in terms of, e.g., shape and color, that it is a natural visual beacon (258). If the acquired feature is not a natural visual beacon, the process returns to acquiring a feature (252). If the acquired feature is a natural visual beacon, feature descriptors are generated based on the characteristics of the acquired feature (260), e.g., using a computer vision technique such as SIFT. The mobile station 102 then transmits a navigation assistance request with the detected feature descriptors to the server 108 (262). The assistance request transmitted to the server 108 may include the feature descriptors as well as the type of feature reported. Additionally, any existing coarse location information either from previous location fix or from an identifier of the local cellular network, which may be a WiFi, Femtocell, or base station. The mobile station 102 receives and stores the navigation assistance message from the server (264) and uses the navigation assistance message to assist in navigation within the local environment (266). Optionally, the mobile station 102 may provide user context information to the server 108 while navigating within the local environment (268), which can be used to update the user context information in the navigation assistance database 112.

Figure 7:
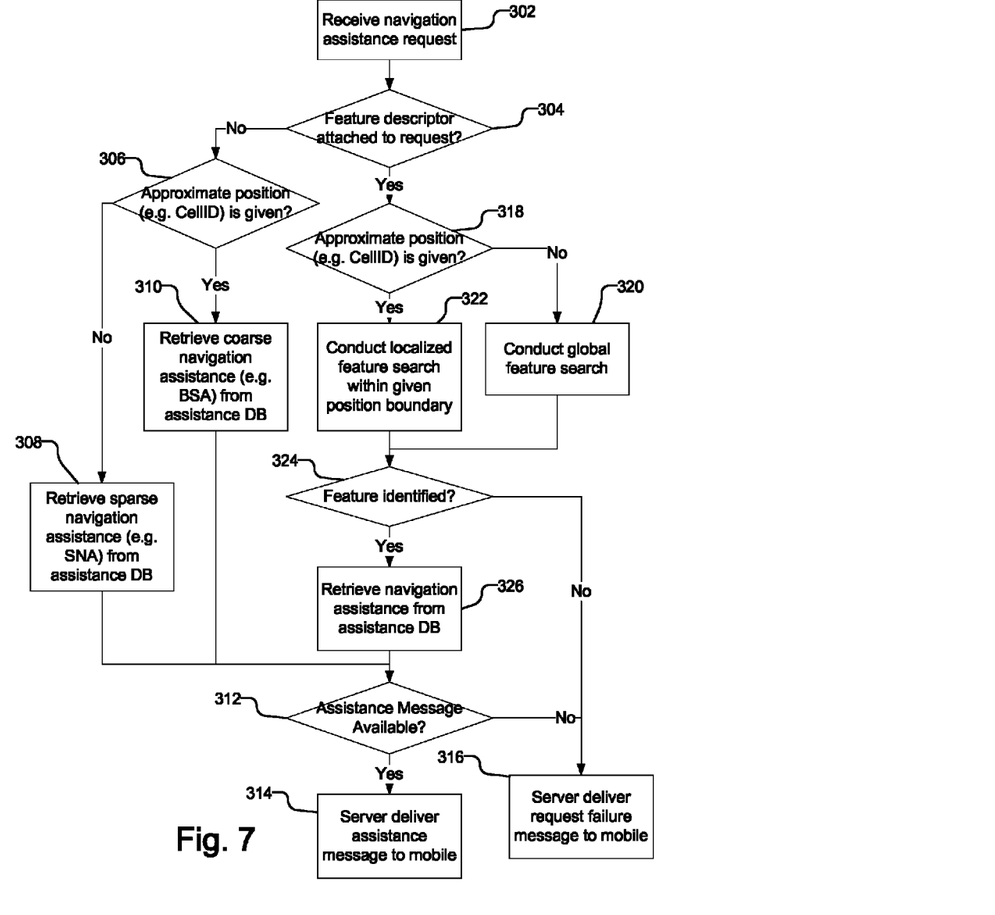
FIG. 7 is a flow chart illustrating the operation of a server that receives an assistance request from a mobile station and obtains and provides a navigation assistance message to the mobile station in response.

FIG. 7 is a flow chart illustrating the operation of a server 108 that receives an assistance request from a mobile station 102 and obtains and provides a navigation assistance message to the mobile station 102 in response. The server 108 receives a navigation assistance request from a mobile station 102 (302) and checks to determine if one or more feature descriptors are attached to the request (304). If the navigation assistance request does not include a feature descriptor, the server 108 checks to determine if the location information of the mobile station 102 is provided with the navigation assistance request (306). If no location information is provided, the server 108 retrieves sparse navigation assistance, e.g., sparse network almanac (SNA), from the navigation assistance database 112 (308). If location information is provided, the server 108 retrieves coarse navigation assistance, e.g., base-station almanac (BSA), from the navigation assistance database 112 (310). The server 108 then determines whether an navigation assistance message is available (312) and either provides the navigation assistance message to the mobile station 102 (314) or provides a failure request to the mobile station (316) if no navigation assistance message is available.

If the server 108 determines that a feature descriptor is attached to the request (304), the server 108 checks to determine if the location information of the mobile station 102 is provided with the navigation assistance request (318). In assistance retrieval, the coarse location provided by the mobile station narrows down the search process by limiting the search window and enhances the probability of unique identification of the feature. If no location information is provided, the server 108 conducts a global feature search in the navigation assistance database 112 (320). If location information is provided, the server 108 conducts a localized feature search in the navigation assistance database 112 within a position boundary based on the provided location information (322). The position boundary may vary based on the uncertainty of the provided location information or may be a predetermined area around the provided location information, e.g., 100 square feet, or a square mile, or any other desired area. If no feature can be identified within the navigation assistance database 112 (324), the server 108 provides a failure request to the mobile station (316). If no feature can be identified within the navigation assistance database 112, the server 108 may store the feature descriptor in the navigation assistance database 112, along with the any provided location information and any known information with respect to environmental context, user context, and neighboring artificial and natural visual beacons so that the feature will be identified in any future navigation assistance requests based on the same feature.

If a feature is identified within the navigation assistance database 112 (324), the server 108 retrieves the navigation assistance message from the navigation assistance database 112 (326). The server 108 then determines whether an navigation assistance message is available (312) and either provides the navigation assistance message to the mobile station 102 (314) or provides a failure request to the mobile station (316) if no navigation assistance is available.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
   imaging a visual beacon within an environment with a mobile station;
   generating, with a processor, at least one feature descriptor for the visual beacon;
   obtaining, with the processor, locations of neighboring visual beacons associated with the feature descriptor, the neighboring visual beacons being different than the visual beacon imaged with the mobile station; and
   using the locations of neighboring visual beacons with the processor to assist in navigating within the environment by updating the mobile station position during navigation based on a location of a neighboring visual beacon of the neighboring visual beacons when the neighboring visual beacon is imaged by the mobile station.

2. The method of claim 1, wherein the visual beacon is one of an artificial visual beacon in which data is encoded and a natural visual beacon in which data is not encoded.

3. The method of claim 1, further obtaining, with the processor, information including a size and type of the neighboring visual beacons.

4. The method of claim 1, further obtaining, with the processor, locations of wireless positioning resources associated with the feature descriptor, wherein the wireless positioning resources transmit wireless signals and comprise at least one of a satellite positioning system, Femtocell, WiFi, and cellular signal access points, and wherein the locations of wireless positioning resources is used with the processor to further assist in navigating within the environment.

5. The method of claim 4, further obtaining, with the processor, at least one of signal type, signal power level, number of channels, frequency and time offset, and corresponding wireless channel characteristics, and tracking statistics including at least one of accuracy, continuity, integrity, and availability of the wireless positioning resources.

6. The method of claim 1, further obtaining, with the processor, environmental context associated with the feature descriptor, wherein the environmental context comprises at least one of a description of the environment type, and a description of surrounding materials, wherein the environmental context is used with the processor to further assist in navigating within the environment.

7. The method of claim 1, further comprising using the locations of neighboring visual beacons to assist in locating and imaging a neighboring visual beacon.

8. The method of claim 4, further comprising using the locations of wireless positioning resources to assist in determining a current position using a wireless positioning resource.

9. The method of claim 6, further comprising using the user environmental context for adjusting navigation processing.

10. The method of claim 9, wherein adjusting the navigation processing comprises at least one of adjusting a rate of position acquisition, adjusting a state of a navigation filter, and determining positioning sources to be used in the navigation processing.

11. The method of claim 1, further obtaining, with the processor, user context associated with the feature descriptor, wherein the user context comprises statistics of previous user information and wherein statistics of previous user information include at least one of average reported user speed, standard deviation of reported user speed, average reported user dwell time, and standard deviation of reported user dwell time, and wherein the user context is used with the processor to further assist in navigating within the environment.

12. A method comprising:
receiving, with a processor, a navigation assistance request from a mobile station, the navigation assistance request including at least one feature descriptor of a visual beacon imaged by the mobile station;
retrieving, with the processor, locations of other visual beacons neighboring the visual beacon and that are different than the visual beacon, the neighboring other visual beacons being associated with the feature descriptor; and
transmitting to the mobile station a navigation assistance message that includes locations of the neighboring other visual beacons in response to the navigation assistance request, the locations of the neighboring other visual beacons transmitted to enable the mobile station to navigate within the environment by updating the mobile station position during navigation based on a location of a neighboring visual beacon of the neighboring visual beacons when the neighboring visual beacon is imaged by the mobile station.

13. The method of claim 12, wherein the navigation assistance request further includes location information, wherein retrieving the locations of the neighboring other visual beacons comprises searching a database based on the feature descriptor and the location information.

14. The method of claim 12, further transmitting a size and type of the neighboring other visual beacons in response to the navigation assistance request.

15. The method of claim 12, further retrieving with the processor locations of wireless positioning resources associated with the feature descriptor, wherein the wireless positioning resources and comprises at least one of a satellite positioning system, Femtocell, WiFi, and cellular signal access points, wherein the navigation assistance message further includes the locations of wireless positioning resources.

16. The method of claim 15, wherein the navigation assistance information further includes at least one of signal type, signal power level, number of channels, frequency and time offset, and corresponding wireless channel characteristics, and tracking statistics including at least one of accuracy, continuity, integrity, and availability of the wireless positioning resources.

17. The method of claim 12, further retrieving with the processor environmental context associated with the feature descriptor, wherein the environmental context comprises at least one of a description of the environment type, and a description of surrounding materials, wherein the navigation assistance message further includes the environmental context.

18. The method of claim 12, further comprising:
receiving a second navigation assistance request that includes at least one feature descriptor of a second visual beacon;
searching a database based on the feature descriptor for the second visual beacon; and
storing the feature descriptor for the second visual beacon in the database when the second feature descriptor is not found in the database.

19. A mobile station comprising:
a camera being operable to image a visual beacon within an environment;
a processor connected to the camera, wherein the processor is configured
to generate at least one feature descriptor of an image of a visual beacon from the camera;
to obtain locations of neighboring visual beacons associated with the feature descriptor, the neighboring visual beacons being different than the visual beacon imaged with the camera; and
to use the locations of the neighboring visual beacons to assist in navigating within the environment by updating the mobile station position during navigation based on a location of a neighboring visual beacon of the neighboring visual beacons when the neighboring visual beacon is imaged by the mobile station.

20. The mobile station of claim 19, further comprising a wireless transceiver, wherein the processor is configured to obtain the locations of neighboring visual beacons by being configured to transmit a navigation assistance request on the wireless transceiver that includes the feature descriptor and the locations of the neighboring visual beacons is received by the wireless transceiver.

21. The mobile station of claim 20, wherein the processor is further configured to obtain locations of wireless positioning resources associated with the feature descriptor, wherein the wireless positioning resources transmit wireless signals, and the processor is further configured to assist in determining a current position using a wireless positioning resource.

22. The mobile station of claim 19, wherein the visual beacon is one of an artificial visual beacon in which data is encoded and a natural visual beacon in which data is not encoded.

23. The mobile station of claim 19, wherein the processor is further configured to obtain information including a size and type of neighboring visual beacons.

24. The mobile station of claim 21, wherein the wireless positioning resources comprises at least one of a satellite positioning system, Femtocell, WiFi, and cellular signal access points.

25. The mobile station of claim 24, wherein the processor is further configured to obtain at least one of signal type, signal power level, number of channels, frequency and time offset, and corresponding wireless channel characteristics, and tracking statistics including at least one of accuracy, continuity, integrity, and availability of the wireless positioning resources.

26. The mobile station of claim 19, wherein the processor is further configured to obtain environmental context associated with the feature descriptor, wherein the environmental context comprises at least one of a description of the environment type, and a description of surrounding materials, wherein the processor is further configured to use the environmental context to assist in navigating within the environment.

27. The mobile station of claim 26, further comprising a display connected to the processor; wherein the environmental context further comprises a map of the environment and the processor is configured to display the map of the environment on the display to assist in locating a neighboring visual beacon.

28. The mobile station of claim 26, wherein the processor is further configured to use the environmental context for adjusting navigation processing.

29. The mobile station of claim 28, wherein adjusting the navigation processing comprises at least one of adjusting a rate of position acquisition, adjusting a state of a navigation filter, and determining positioning sources to be used in the navigation processing.

30. A system for accessing and updated positional information for a mobile station comprising:
- means for generating at least one feature descriptor of a visual beacon within an environment based on an image of the visual beacon;
- means for obtaining locations of neighboring visual beacons associated with the feature descriptor, the neighboring visual beacons being different than the imaged visual beacon; and
- means for using the locations of the neighboring visual beacons to assist in navigating within the environment by updating the mobile station position during navigation based on a location of a neighboring visual beacon of the neighboring visual beacons when the neighboring visual beacon is imaged by the mobile station.

31. The system of claim 30, wherein the means for obtaining the locations of the neighboring visual beacons comprises a means for transmitting a navigation assistance request that includes the feature descriptor of the visual beacon and a means for receiving the locations of neighboring visual beacons.

32. The system of claim 30, wherein the means for obtaining the locations of neighboring visual beacons comprises a database of locations of visual beacons and a means for searching for the database based on the feature descriptor.

33. The system of claim 30, further comprising means for obtaining a size and type of neighboring visual beacons.

34. The system of claim 30, further comprising means for obtaining wireless positioning resources associated with the feature descriptor, wherein the wireless positioning resources transmit wireless signals and comprises at least one of a satellite positioning system, Femtocell, WiFi, and cellular signal access points, and at least one of signal type, signal power level, number of channels, frequency and time offset, and corresponding wireless channel characteristics, and tracking statistics including at least one of accuracy, continuity, integrity, and availability of the wireless positioning resources, and further comprising means for using the locations of wireless positioning resources to further assist in navigating within the environment.

35. The system of claim 30, further comprising means for obtaining environmental context associated with the feature descriptor, wherein the environmental context comprises at least one of a description of the environment type, and a description of surrounding materials, and further comprising means for using the environmental context to further assist in navigating within the environment.

36. A non-transitory computer-readable medium including program code stored thereon, comprising:
- program code to determine at least one feature descriptor from an image of a visual beacon;
- program code to obtain locations of neighboring visual beacons associated with the feature descriptor, the neighboring visual beacons being different than the imaged visual beacon; and
- program code to use the locations of the neighboring visual beacons to assist in navigating within the environment by updating the mobile station position during navigation based on a location of a neighboring visual beacon when the neighboring visual beacon of the neighboring visual beacons is imaged by the mobile station.

37. The non-transitory computer-readable medium of claim 36, further comprising program code to transmit a navigation assistance request that includes the feature descriptor of the visual beacon.

38. The method of claim 1, wherein using the locations of the neighboring visual beacons with the processor to assist in navigating within the environment comprises minimizing amassed errors while navigating within the environment using the locations of the neighboring visual beacons.

39. The method of claim 12, further retrieving, with the processor, user context associated with the feature descriptor, wherein the user context comprises statistics of previous user information and wherein statistics of previous user information include at least one of average reported user speed, standard deviation of reported user speed, average reported user dwell time, and standard deviation of reported user dwell time, and wherein the navigation assistance message further includes the user context.

40. The mobile station of claim 19, wherein the processor is further configured to obtain user context associated with the feature descriptor, wherein the user context comprises statistics of previous user information, wherein statistics of previous user information include at least one of average reported user speed, standard deviation of reported user speed, average reported user dwell time, and standard deviation of reported user dwell time, and wherein the processor is further configured to use the user context to assist in navigating within the environment.

41. The system of claim 30, further comprising means for obtaining user context associated with the feature descriptor, wherein the user context comprises statistics of previous user information, wherein statistics of previous user information include at least one of average reported user speed, standard deviation of reported user speed, average reported user dwell time, and standard deviation of reported user dwell time, and further comprising means for using the user context to further assist in navigating within the environment.

* * * * *